US00RE49303E

(19) United States
(12) Reissued Patent
Liu et al.

(10) Patent Number: US RE49,303 E
(45) Date of Reissued Patent: Nov. 22, 2022

(54) ARTICULATING BED WITH ADJUSTABLE ARTICULATING LUMBAR SUPPORT

(71) Applicant: ERGOMOTION, INC., Goleta, CA (US)

(72) Inventors: Peng Liu, ZheJiang (CN); Joey Krueger, Goleta, CA (US); Matthew Fissette, Santa Barbara, CA (US); Joseph Ermalovich, Santa Babara, CA (US)

(73) Assignee: ERGOMOTION, INC, Goleta, CA (US)

(21) Appl. No.: 17/378,351

(22) Filed: Jul. 16, 2021

Related U.S. Patent Documents

Reissue of:
(64) Patent No.: 10,350,122
Issued: Jul. 16, 2019
Appl. No.: 15/146,869
Filed: May 4, 2016

U.S. Applications:
(60) Provisional application No. 62/157,134, filed on May 5, 2015.

(51) Int. Cl.

| | |
|---|---|
| ***A61G 7/015*** | (2006.01) |
| ***A47C 20/04*** | (2006.01) |
| ***A61G 7/07*** | (2006.01) |
| ***A47C 17/04*** | (2006.01) |

(Continued)

(52) U.S. Cl.
CPC ..... *A61G 7/07* (2013.01); *A47C 7/462* (2013.01); *A47C 17/04* (2013.01); *A47C 20/04* (2013.01); *A61G 7/015* (2013.01); *A61G 7/018* (2013.01)

(58) Field of Classification Search
CPC ..... A61G 7/015; A61G 7/07; A61G 7/018; A47C 20/04; A47C 7/46; A47C 7/462; A47C 17/04
See application file for complete search history.

(56) References Cited

U.S. PATENT DOCUMENTS 1,055,241 A * 3/1913 Terry ..... A61G 7/015 5/618
2,582,565 A * 1/1952 Schnippel ..... A61G 7/015 60/434

(Continued)

*Primary Examiner* — Patricia L Engle
(74) *Attorney, Agent, or Firm* — Finnegan, Henderson, Farabow, Garrett & Dunner, LLP

(57) ABSTRACT

An actuating mechanism for lumbar support in an articulating bed incorporates a support frame for an articulating section having a seat section and an upper body support section. An actuator with a ram is pivotally attached to the upper body support section with a bracket. A lumbar actuation lever is pivotally attached to the ram and extends from a torque tube rotatable in bearing blocks mounted to the upper body support section. A second actuator is pivotally attached to the upper body support section with a second bracket and includes a second ram. At least one angled lifter arm extends from the torque tube and pivotally attaches to at least one lever engaging a lumbar support element through at least one aperture in the upper body support section. An actuator element extends from at least one lever and is connected to the second ram. The actuator element and associated lever rotate about a pivot point on the associated angled lifter arm.

9 Claims, 14 Drawing Sheets

(51) Int. Cl.
*A47C 7/46* (2006.01)
*A61G 7/018* (2006.01)

(56) References Cited

U.S. PATENT DOCUMENTS

| | | | | |
|---|---|---|---|---|
| 3,807,794 | A * | 4/1974 | Beyer | A47C 7/462 297/284.4 |
| 7,930,780 | B2 | 4/2011 | Clenet | |
| 8,683,629 | B2 | 4/2014 | Clenet et al. | |
| 2009/0178201 | A1* | 7/2009 | Lujan | A61G 7/07 5/630 |
| 2013/0145553 | A1* | 6/2013 | Shih | A61G 7/015 5/624 |
| 2018/0161232 | A1* | 6/2018 | Grove | A47C 7/462 |
| 2020/0214461 | A1* | 7/2020 | Wang | A47C 20/08 |
| 2021/0393043 | A1* | 12/2021 | Wang | A47C 19/025 |
| 2022/0022659 | A1* | 1/2022 | Chung | A47C 20/041 |

* cited by examiner

ARTICULATING BED WITH ADJUSTABLE ARTICULATING LUMBAR SUPPORT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

REFERENCE TO RELATED APPLICATIONS

This application *is a reissue application of U.S. Pat. No. 10,350,122, issued on Jul. 16, 2019, from U.S. patent application Ser. No. 15/146,869, filed on May 14, 2016, which* claims priority of U.S. Provisional Application Ser. No. 62/157,134 filed on May 5, 2015 and having a common assignee with the present application, the [disclosure of which is] *entire contents of each of the above applications are hereby* incorporated [herein] by reference.

BACKGROUND

Field

This invention relates generally to the field of adjustable beds and more particularly to a structure for an articulating bed having an integral adjustable lumbar support incorporating dual actuation for lumbar penetration and position.

Description of the Related Art

Articulating beds have long been used in hospital and healthcare facilities to allow positioning of a patient in a reclining position, sitting position, elevated leg position or combinations of these positions. General usage of articulating beds has been rapidly expanding due to the comfort and convenience available from adjusting the bed to desired positions for reading, general relaxation or sleeping.

The mechanical structure and drive mechanisms for such articulating beds must be able to support the weight of both a mattress and the occupant. Due to the size, weight, fabrication materials and configuration of the mattress and supporting structure, maintaining rigidity in the system may also be challenging. Typical articulating beds provide an upper body positioning element and a thigh and lower leg positioning element either individually active or with combined actuation. One noted disadvantage of articulating bed systems when both the upper body positioning element and the leg positioning elements are elevated is the tendency for positioning of the lower back in a curved posture which may result in undesirable lumbar strain. Lumbar positioning or support elements have been proposed as disclosed in U.S. Pat. No. 8,683,629 issued on Apr. 1, 2014 entitled ARTICULATING BED WITH LUMBAR AND HEAD ADJUSTMENT having a common assignee with the present invention. However, due to the differences in height and torso length of individual users, the relative position of lumbar support extension or penetration into the mattress to provide lumbar curvature may not be at an appropriate location with respect to the user's body.

It is therefore desirable to provide an articulating bed having lumbar support adjustment with reduced mattress interference and adjustability of the position for penetration of the support with simple and unimposing actuation elements.

SUMMARY

The embodiments disclosed herein overcome the shortcomings of the prior art by providing an actuating mechanism for lumbar support an articulating bed which incorporates a support frame for an articulating section having a seat section and an upper body support section. An actuator with a ram is pivotally attached to the upper body support section with a bracket. A lumbar actuation lever is pivotally attached to the ram and extends from a torque tube rotatable in bearing blocks mounted to the upper body support section. A second actuator is pivotally attached to the upper body support section with a second bracket and includes a second ram. At least one angled lifter arm extends from the torque tube and pivotally attaches to at least one lever engaging a lumbar support element through at least one aperture in the upper body support section. An actuator element extends from at least one lever and is connected to the second ram. The actuator element and associated lever rotate about a pivot point on the associated angled lifter arm. The lumbar support element is extendible with respect to the upper body support section. With the first ram in a first position minimal deflection is created in a lumbar region of a mattress supported on the upper body support section. With the torque tube rotated with the first ram in a second position. The at least one angled lifter arm is extended through the at least one aperture to elevate the lumbar support element. The lumbar support element is positionable across an arc from an upper position with respect to the upper body support section with the second ram in a first position to a lower position with respect to the upper body support section with the second ram in a second position.

BRIEF DESCRIPTION OF THE DRAWINGS

These and other features and advantages of the present invention will be better understood by reference to the following detailed description of exemplary embodiments when considered in connection with the accompanying drawings wherein.

DETAILED DESCRIPTION

Figure 1:
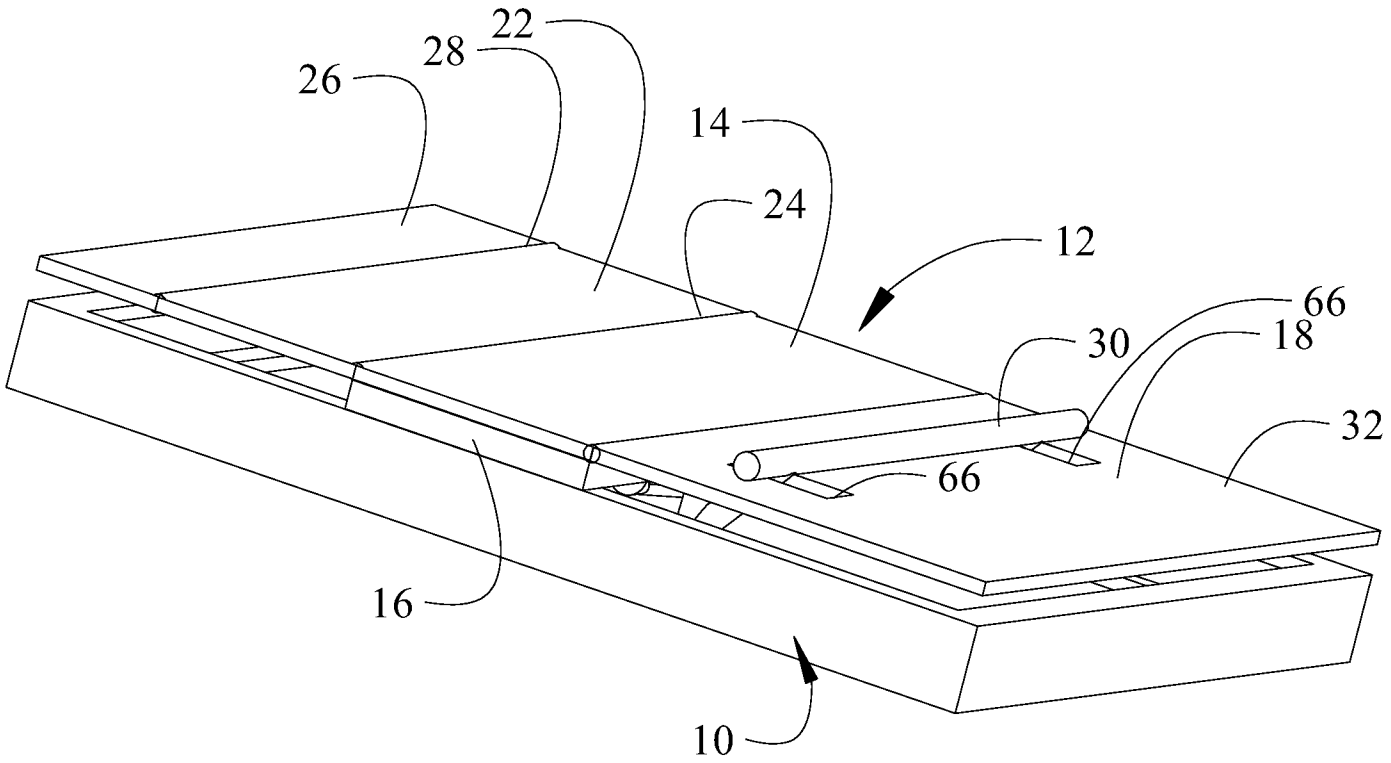
FIG. 1 is a top isometric partial view of an articulating bed system employing an example embodiment in a fully retracted or unarticulated position with the mattress removed for clarity.

Embodiments shown in the drawings and described herein provide an actuation system for an articulating bed which incorporates within an elevating upper body support section an integral lumbar support adjustment mechanism having dual actuation for penetration and position. The lumbar support adjustment mechanism is enabled with a first actuator for rotation of a torque tube providing extension of angled lifter arms and attached levers from a base or retracted position to an extended position. The lumbar support adjustment mechanism employs a cylindrical or semi-cylindrical lumbar support element to engage the mattress bottom to preclude shifting or catching of the mattress during extension or retraction. A second actuator engages a linkage connected to the lumbar support element that pivots with respect to the lifter arms to alter an angle between the lifter arms and levers. This mechanical action alters the location of the cylindrical interface of the lumbar support element along the mattress relative to the torso length of the occupant.

Figure 2A:
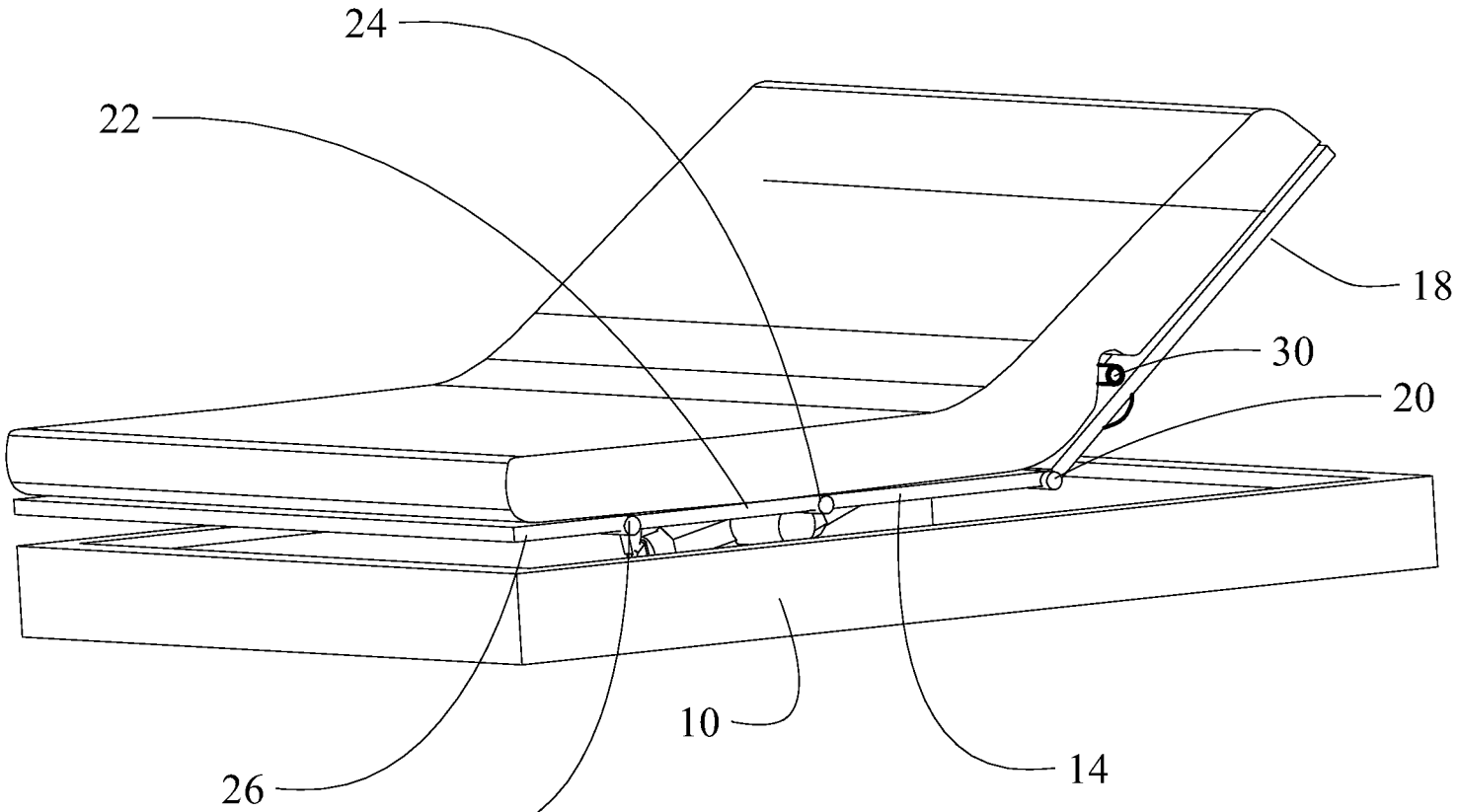
FIGS. 2A and 2B are top isometric views of the articulating bed system of FIG. 1 with the upper body section elevated and the lumbar support adjustment mechanism in a retracted position.
Figure 2B:
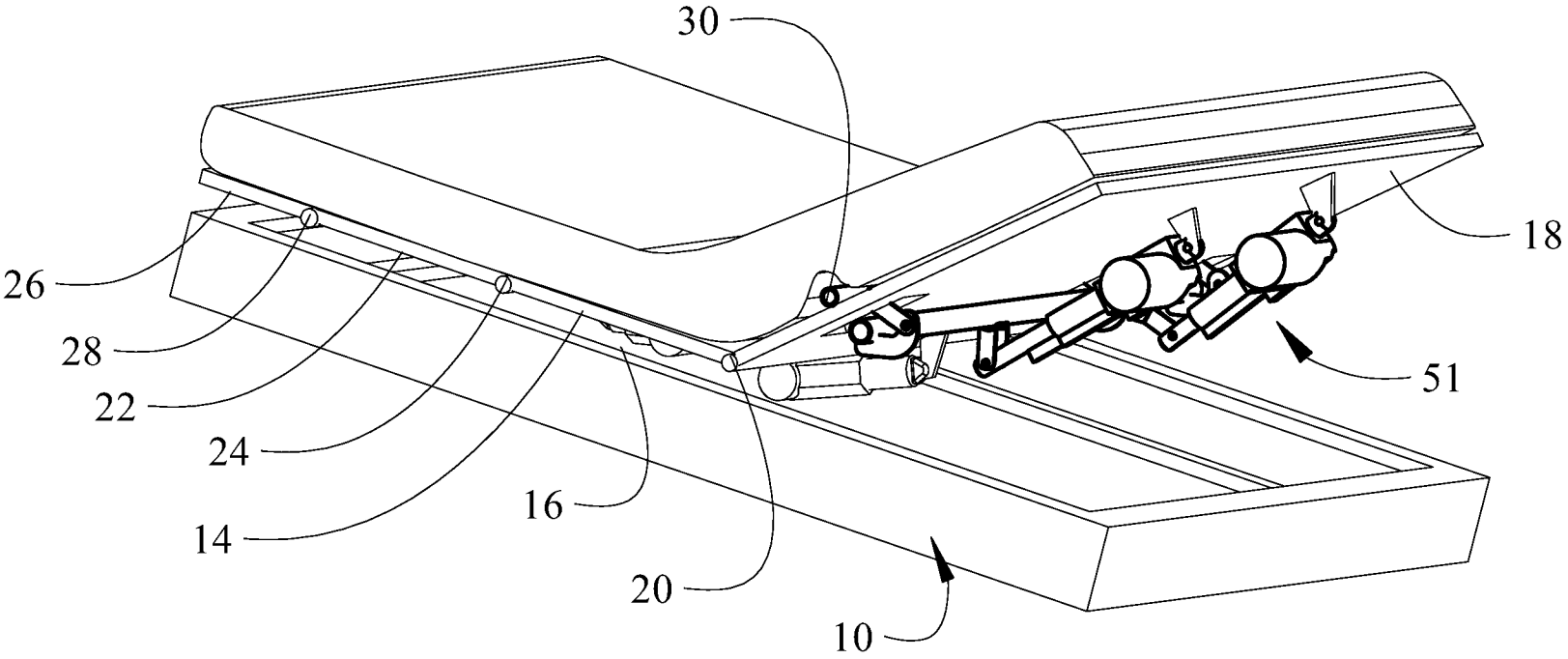

Referring to the drawings, FIG. 1 shows an articulating bed system employing an example embodiment of the present invention. The bed system includes a support frame 10 and articulation system 12. The articulation system includes a seat section 14, which for the embodiment shown is mounted on a seat carriage 16 which is mounted on the support frame 10. An upper body support section 18 is attached to the seat section 14 with hinge elements 20. A thigh support section 22 is attached to the seat section 14 with hinge elements 24 and a foot support section 26 is attached to the thigh support section 22 with hinge elements 28. Operation of the articulation system may be accomplished as described in U.S. Pat. No. 7,930,780 entitled ADJUSTABLE BED FRAME ASSEMBLY having a common assignee with the present application, the disclosure of which is incorporated herein by reference. For the embodiment shown in the drawings, the articulation system maintains equal wall distance for an upper extremity of the articulating sections, as shown in FIGS. 2A and 2B, by translation of the seat carriage 16 on the support frame 10 with upward articulation of the upper body support section 18. In alternative embodiments, a seat section fixed to the support frame may be employed. A lumbar support element 30 (seen in FIG. 1 without the mattress for clarity) is mounted for actuation in the upper body support section 18, as will be described in greater detail subsequently.

Figure 3A:
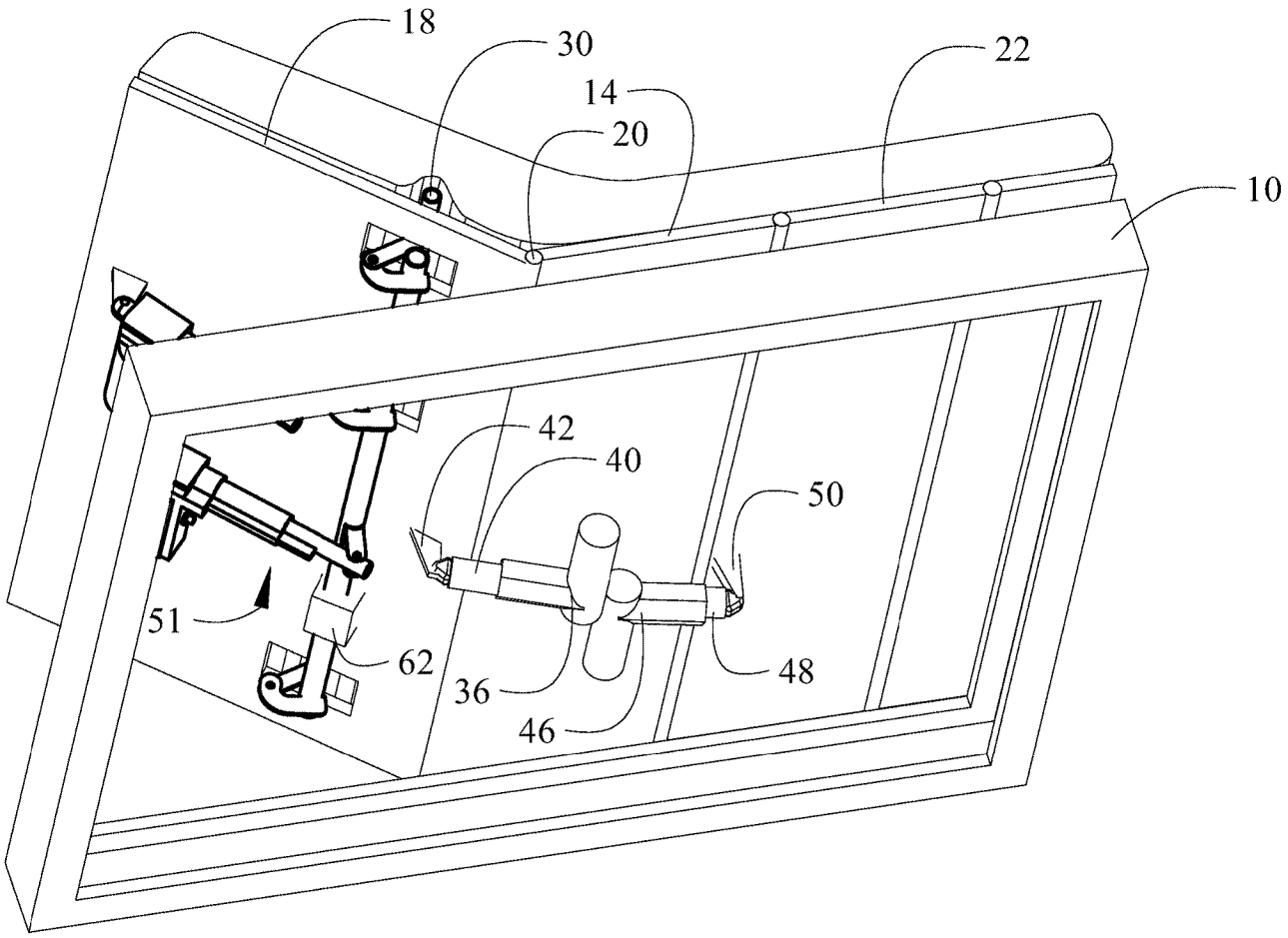
FIG. 3A is a bottom isometric view of the articulating bed system showing the actuation components of the lumbar support adjustment mechanism in the retracted state.

FIG. 3A shows the actuation components for the articulation system for the bed. A first actuator 36, which may be attached to the seat section 14 or supported by a cross member of the support frame 10, incorporates a ram 40 pivotally connected to a lever arm 42 which is attached as an activation mechanism to the upper body support section 18. Extension of the ram 40 exerts force on the lever arm 42 causing the upper body support section 18 to rotate about the hinge elements 20 to elevate the upper body support section from the position shown in FIG. 1 to the position shown in FIGS. 2A and 2B. A second actuator 46 mounted to the seat section 14 or supported by a cross member of the support frame 10 incorporates a ram 48 pivotally connected to a lever arm 50 attached to the thigh support section. Extension of the ram 48 exerts force on the lever arm 50 to rotate the thigh support section 22 about hinge elements 24.

Figure 3B:
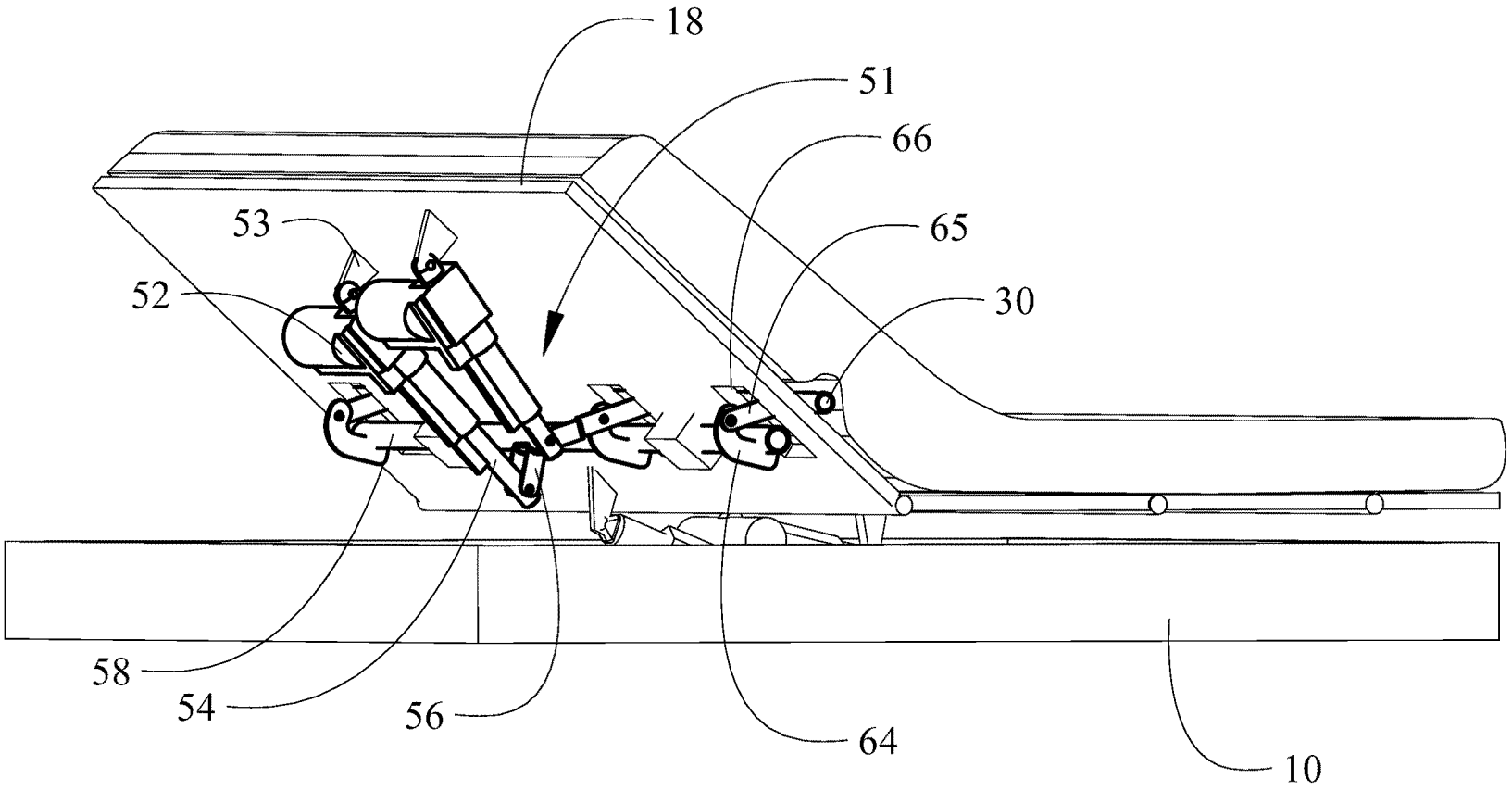
FIG. 3B is a rear isometric view of the articulating bed system showing the actuation components of the lumbar support mechanisms in the retracted state
Figure 4:
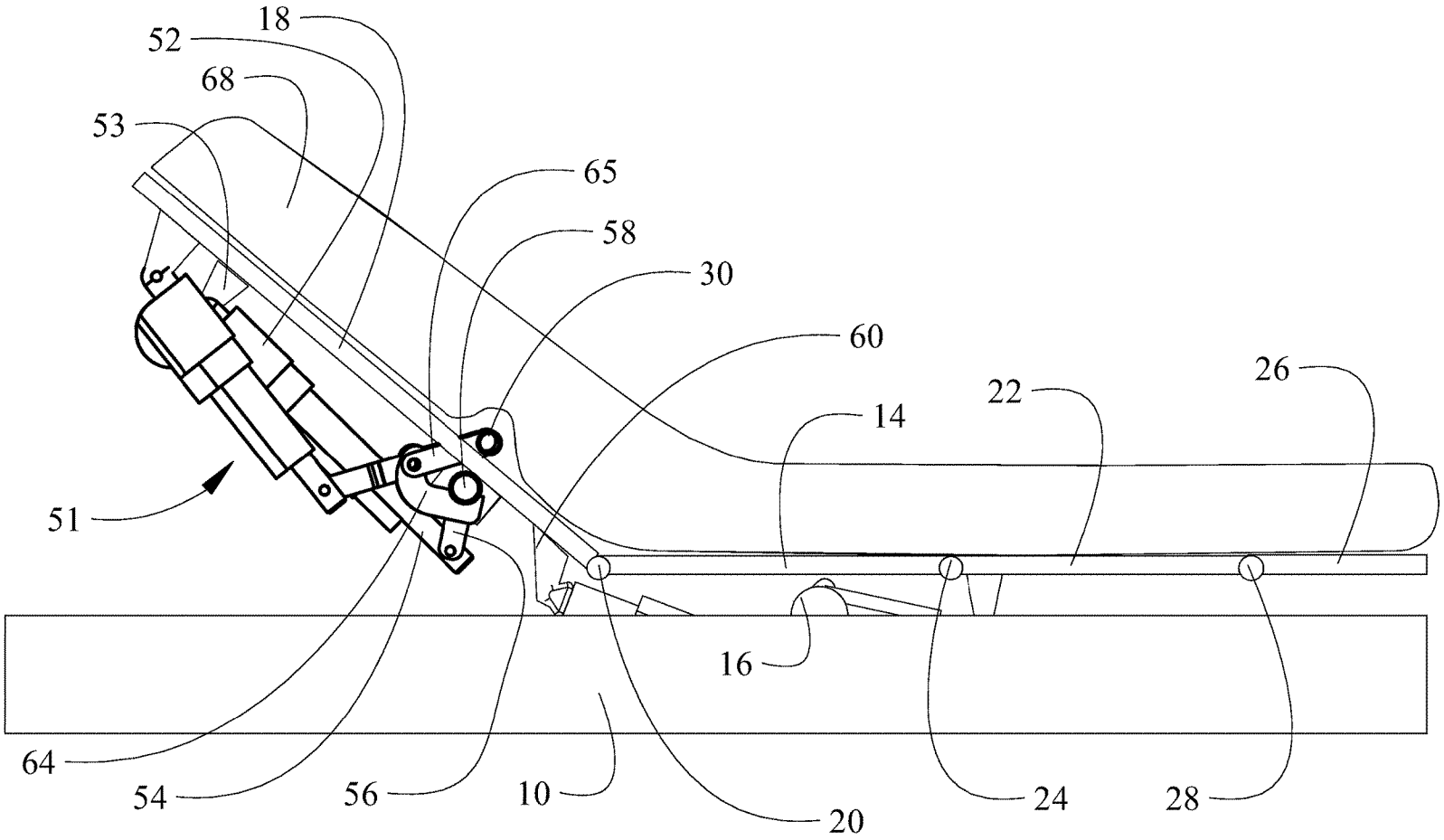
FIG. 4 is a side view of the articulating bed system of FIG. 1 with the upper body portion elevated and the lumbar support adjustment mechanism in a retracted position showing the mattress as installed.

As best seen in FIG. 3B, a lumbar support adjustment mechanism incorporates a first actuator system 51 having a first actuator 52 which is pivotally attached to the upper body support section 18 with bracket 53. Actuator 52 includes a ram 54 which is pivotally attached to a lumbar actuation lever 56. Actuation lever 56 extends from a torque tube 58 which rotates in bearing blocks 62 mounted to the upper body support section 18. Angled lifter arms 64 extend from the torque tube 58 and attach to lumbar support element 30 with pivotally attached levers 65 extending through apertures 66 in the upper body support section 18. With ram 54 in the extended position, lumbar support element 30 is retracted toward the upper body support section 18 creating minimal deflection of the mattress 68 in the lumbar region as shown in FIG. 4.

Figure 5A:
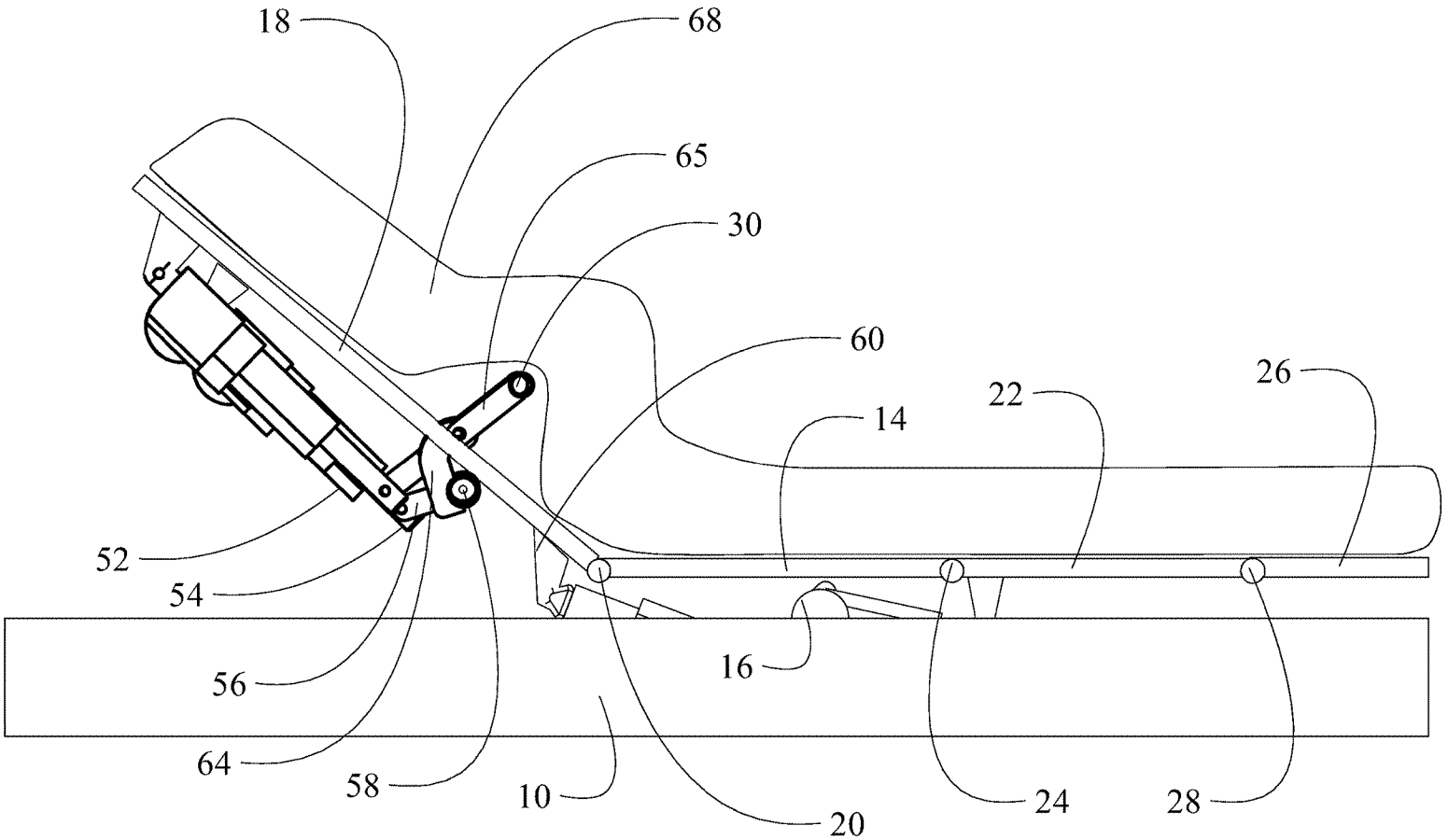
FIG. 5A is a side view of the articulating bed system with the lumbar support adjustment mechanism extended with the upper body portion in an elevated position with the mattress removed for clarity.
Figure 5B:
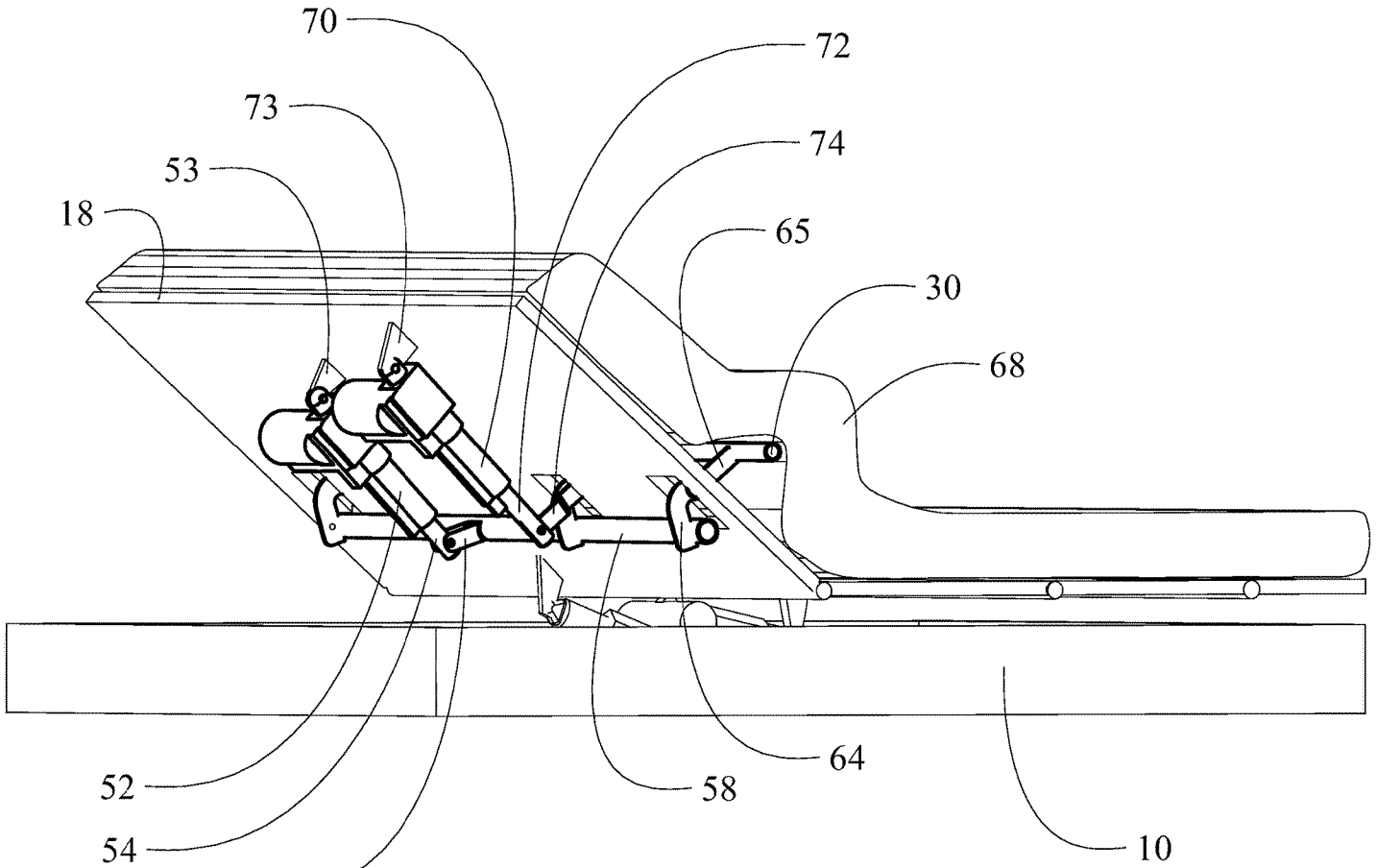
FIG. 5B is a top isometric of the articulating bed system with the upper body portion elevated and the lumbar support adjustment mechanism in an extended position showing the mattress as installed.

Retraction of the ram 54 urges actuation lever 56 to rotate the torque tube 58 thereby rotating the angled lifter arms 64 to extend the levers 65 through apertures 66 to elevate the lumbar support element 30 as shown in FIGS. 5A and 5B (deformation of the mattress is exaggerated and spaced from the lumbar support element for clarity). The cylindrical shape of the lumbar support element 30 smoothly translates against the lower surface of mattress 68 to preclude grabbing or constricting of the mattress during extension or retraction of the lumbar support element. In alternative embodiments, one or more rollers may be employed integral to the lumbar support element for even greater lubricity in contact between the lumbar support element and the mattress lower surface.

Figure 6:
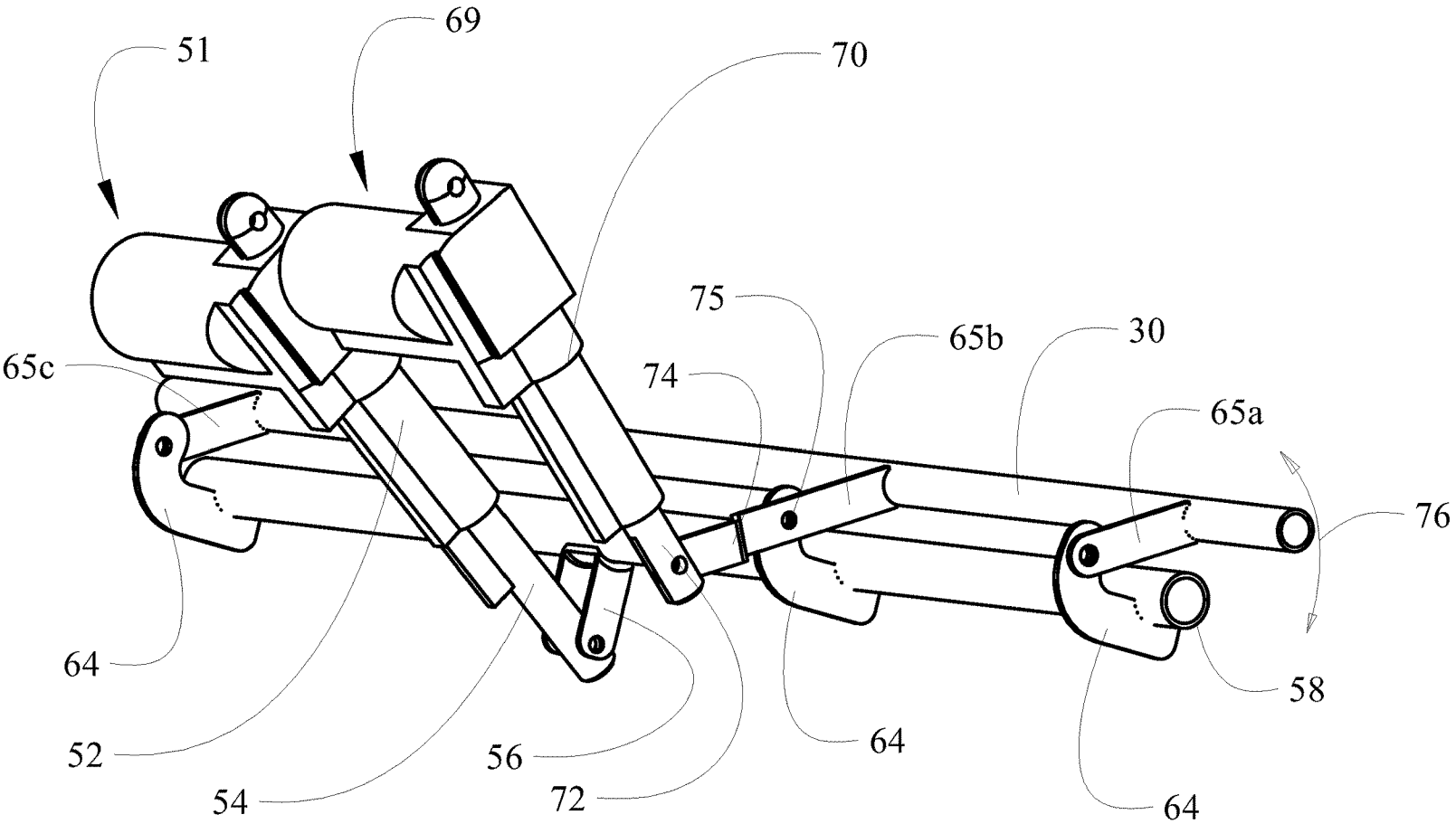
FIG. 6 is a detailed pictorial view of the elements of the lumbar support adjustment mechanism.

Details of the lumber support adjustment mechanism are shown in FIG. 6. As previously described, a first actuation system in the mechanism includes first actuator 52 and ram 54 engaging actuation lever 56 to rotate the torque tube 58 rotate the angled lifter arms 64 to extend the levers 65a, 65b and 65c to elevate the lumbar support element 30. Angled lifter arms 64 are pivotally attached to the levers 65a, 65b and 65c. A second actuation system 69 includes a second actuator 70 having an extendible ram 72 and also pivotally attached to the upper body support section 18 with bracket 73 (best seen in FIG. 5B). Ram 72 pivotally engages an actuation element 74 extending from central lever 65b. Actuation element 74 and central lever 65b both rotate about a pivot point 75 on the central angled lifter arm 64. Extension or retraction of the ram 72 rotates actuation element 74 causing rotation of lever 65b and, through the commonly attached lumbar support member, levers 65a and 65c with respect to the angled lifter arms 64. This rotation alters the position of lumbar support element 30 to transition across an arc represented by arrow 76. While shown in the embodiment presented in the drawings as having three angled lifter arms and three associated levers with the positional actuation element extending from the central lever, an alternative embodiment may employ two angled lifter arms with two associated levers and the positional actuation element may be extended from either of the two levers. A further alternative embodiment may employ a single angled lifter arm with associated lever and extending positional actuation element.

Figure 7A:
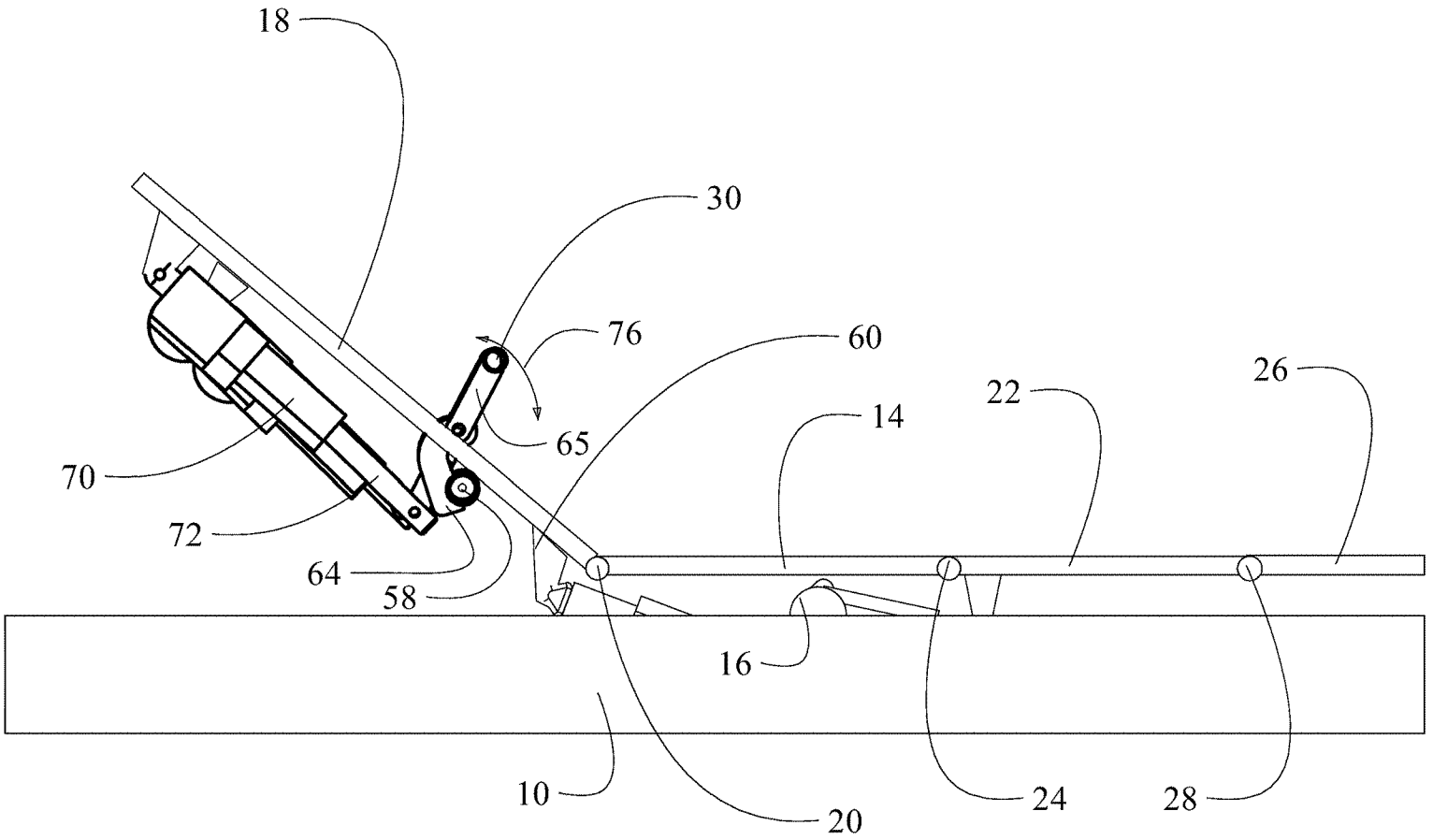
FIG. 7A is a side view of the articulating bed system with the lumbar support adjustment mechanism extended and positioned in a central orientation.
Figure 7B:
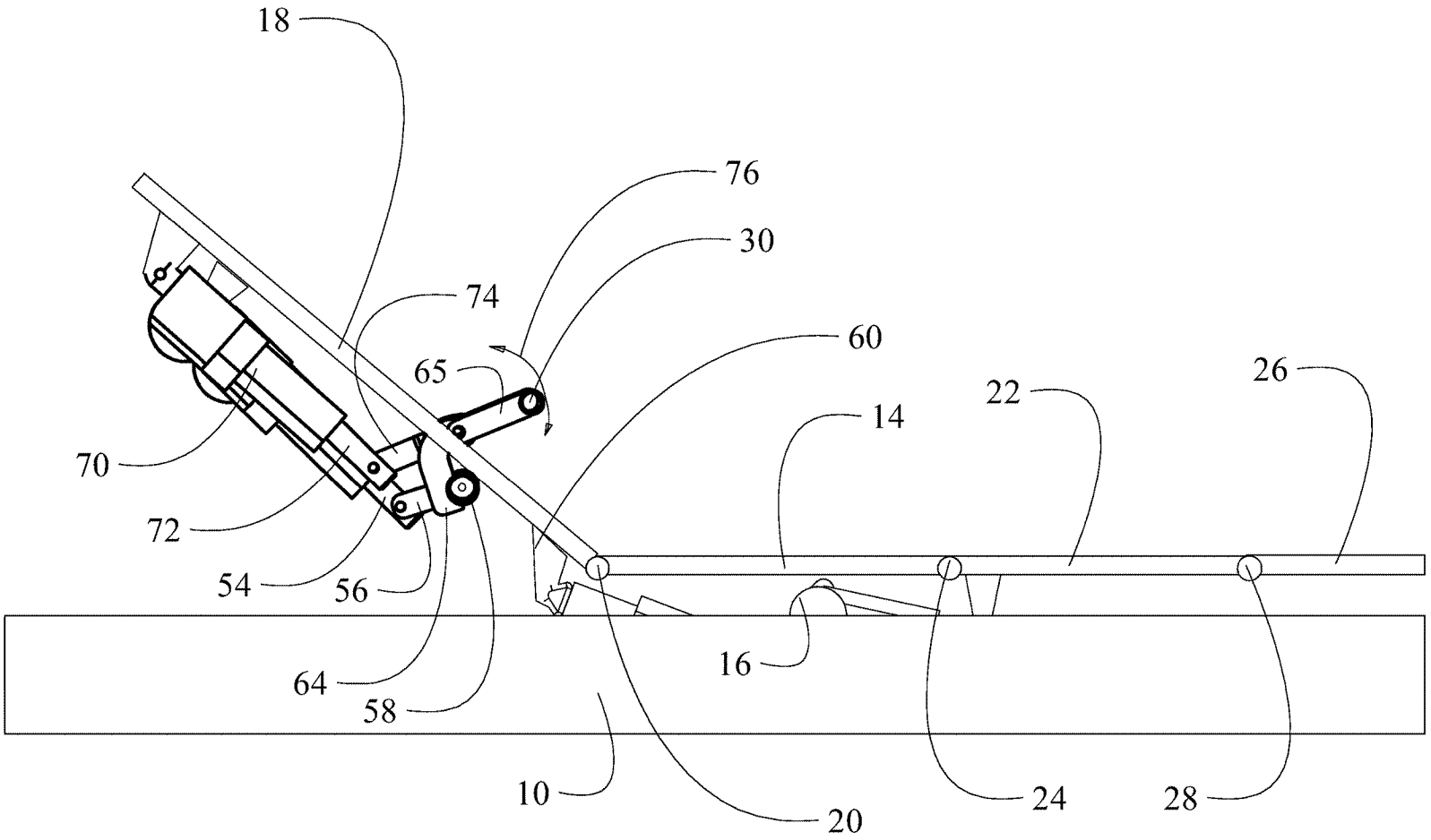
FIG. 7B is a side view of the articulating bed system with the lumbar support adjustment mechanism extended and positioned in a lower orientation.
Figure 7C:
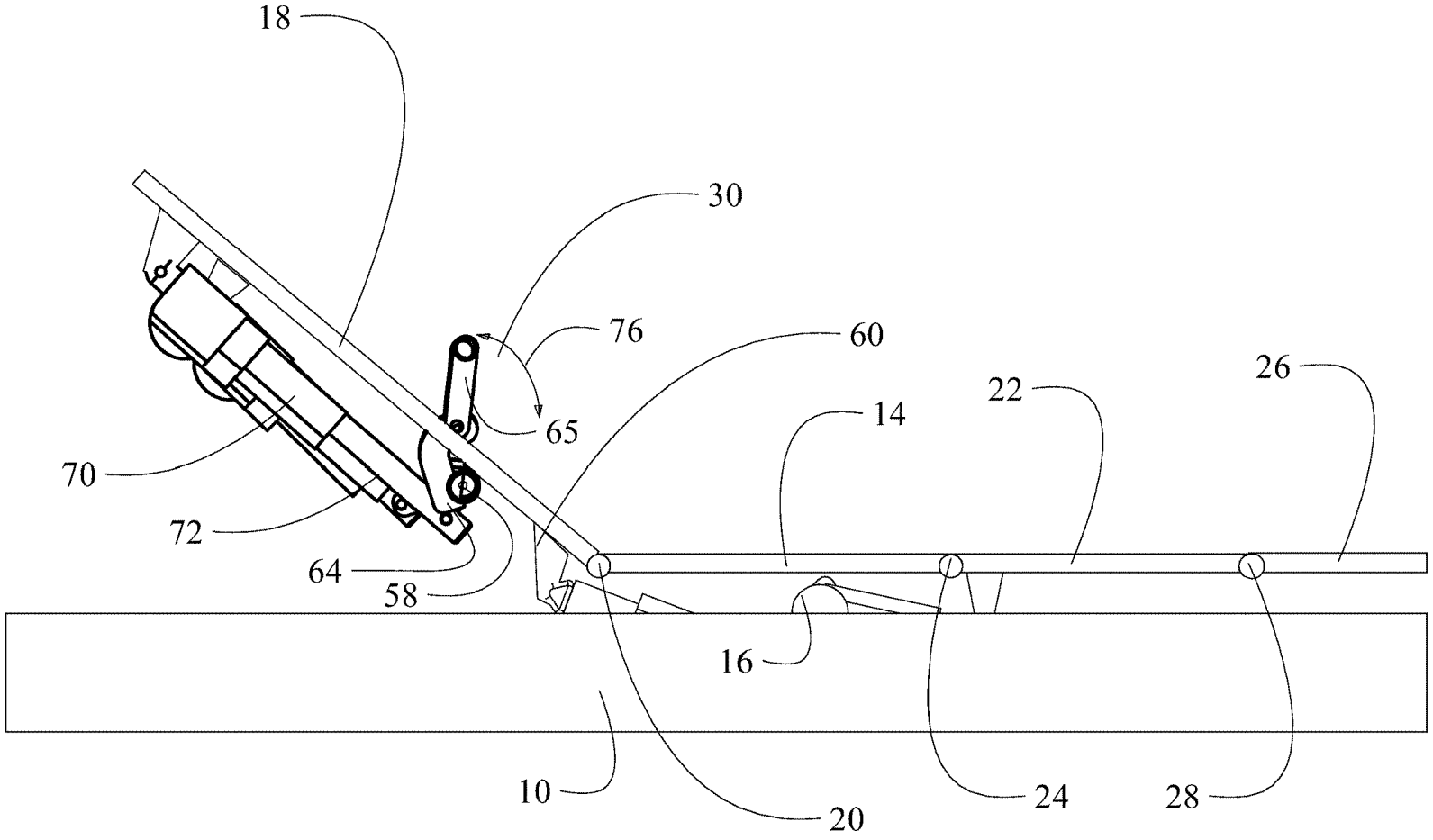
FIG. 7C is a side view of the articulating bed system with the lumbar support adjustment mechanism extended and positioned in an upper orientation.
Figure 8:
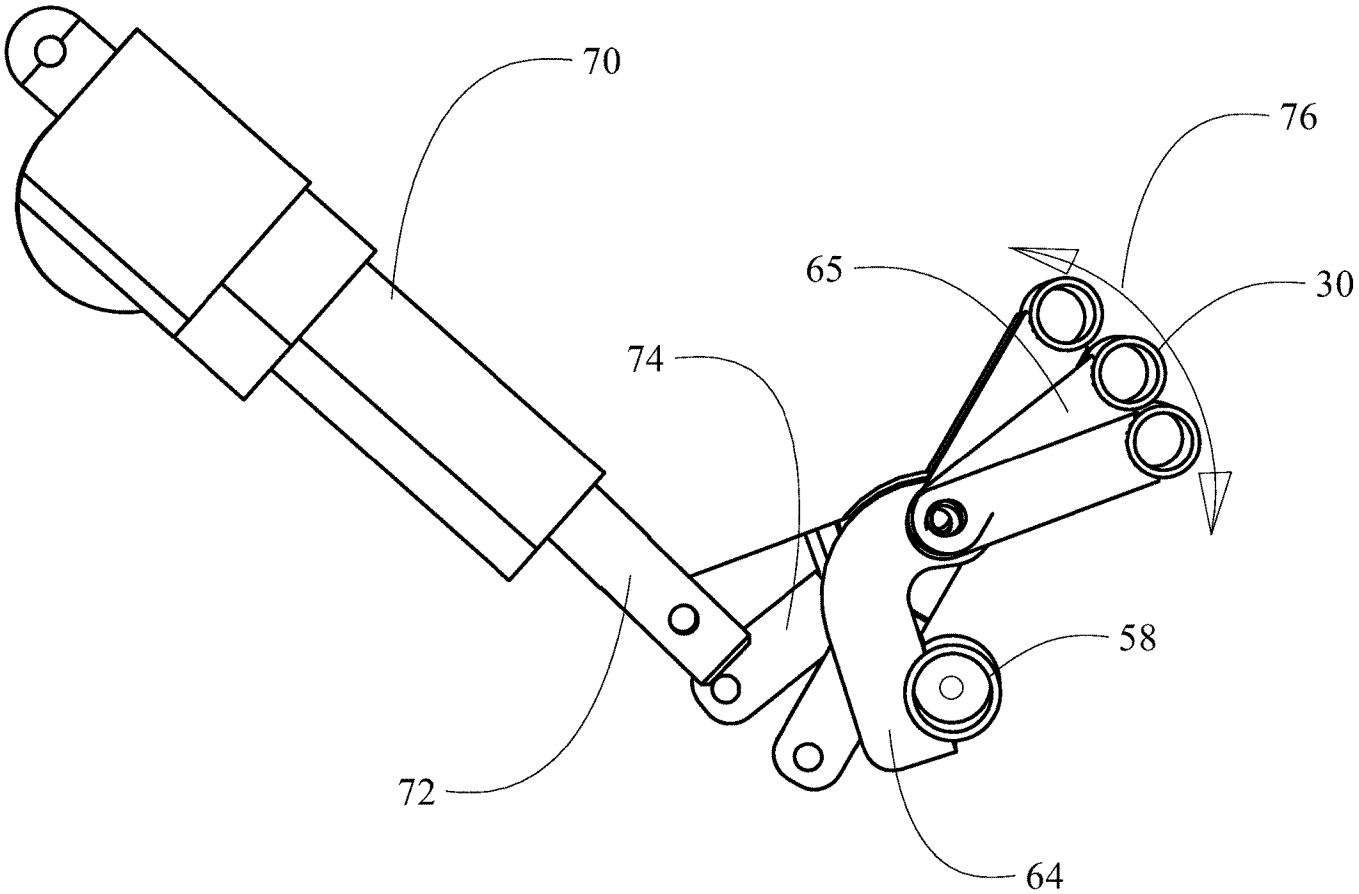
FIG. 8 is a detailed overlaid side view of the lumbar support adjustment mechanism in an extended position with the levers and lumbar engagement element actuated to upper, central and lower orientation.

As seen in FIG. 7A, extension of ram 72 pivots actuation element 74 counter-clockwise, in the embodiment shown, rotating levers 65 to position the lumbar support element 30 in a central position on the back of a user lying in the bed. Similarly as seen in FIG. 7B, retraction of ram 72 pivots actuation element 74 clockwise rotating levers 65 to position the lumber support element 30 in a lower position toward the seat section 14 to engage the lumbar penetration lower on the user's back. As seen in FIG. 7C further extension of the ram 72 further pivots actuation element 74 counter clockwise to a higher position on the back of a user lying in the bed. FIG. 8 (with actuator 52, ram 54 and actuation lever 56 removed for clarity) shows in overlay the upper, central and lower positions of the lumber support element 30 with the ram extended, partially extended and retracted to rotate the lumbar support element over the arc 76.

Figure 9:
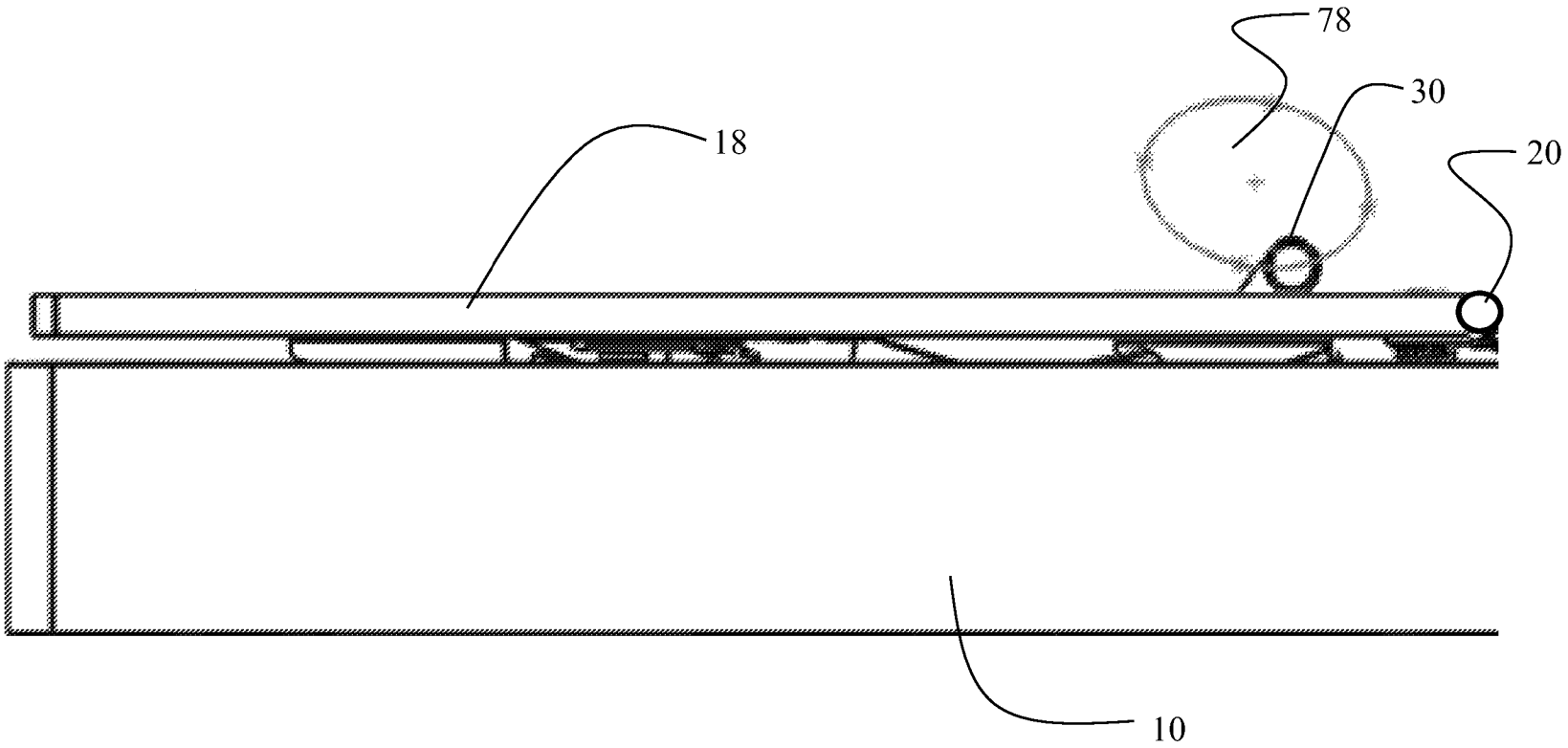
FIG. 9 is a partial side view of the articulating bed system demonstrating the elliptical area of extension and positioning of the lumber engagement element.

Each of the rams 54 and 72 are positionable by their respective actuators 52 and 70 through a range from fully retracted to fully extended. This provides significant flexibility in positioning the lumbar support element 30 to accommodate the length of the user's back and the desired amount of extension. As seen in FIG. 9, the full range of motion of both actuators acting in concert allows positioning of lumbar support element 30 at any point within an ellipsoidal area 78.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A lumbar support adjustment mechanism for an articulating bed comprising:

a first actuator pivotally attached to an upper body support section with a first bracket, said first actuator including a first ram;

a lumbar actuation lever extending from a torque tube rotatable in bearing blocks mounted to the upper body support section and pivotally attached to the first ram;

a second actuator pivotally attached to the upper body support section with a second bracket, said second actuator including a second ram;

at least one angled lifter arm extending from the torque tube and pivotally attached to at least one lever engaging a lumbar support element through at least one aperture in the upper body support section;

an actuation element extending from at least one lever and connected to the second ram, said actuation element and at least one lever rotating about a pivot point on said at least one angled lifter arm;

said lumbar support element extendible with respect to the upper body support section, with the first ram in a first position creating minimal deflection in a lumbar region of a mattress supported on the upper body support section, and said torque tube rotated with the first ram in a second position extending the at least one angled lifter arm through the at least one aperture to elevate the lumbar support element; and, said lumbar support element positionable across an arc from an upper position with respect to the upper body support section with the second ram in a first position to a lower position with respect to the upper body support section with the second ram in a second position.

2. The lumbar support adjustment mechanism as defined in claim 1 wherein the lumbar support element is substantially cylindrical for contact with the mattress.

3. The lumbar support adjustment mechanism as defined in claim 1 wherein the at least one angled lifter arm comprises three angled lifter arms, said at least one lever comprises three levers and said actuator element extends from a central one of the levers.

4. The lumbar support adjustment mechanism as defined in claim 1 wherein said first ram and said second ram are extendible through a range positioning said lumbar support element at any desired point in an ellipsoidal area.

5. An articulating bed comprising:

a support frame;

an articulating section supported on the support frame and having a seat section and an upper body support section;

a first actuator pivotally attached to the upper body support section with a first bracket, said first actuator including a first ram;

a lumbar actuation lever extending from a torque tube rotatable in bearing blocks mounted to the upper body support section and pivotally attached to the first ram;

a second actuator pivotally attached to the upper body support section with a second bracket, said second actuator including a second ram;

at least one angled lifter arm extending from the torque tube and pivotally attached to at least one lever engaging a lumbar support element through at least one aperture in the upper body support section;

an actuation element extending from at least one lever and connected to the second ram, said actuation element and at least one lever rotating about a pivot point on said at least one angled lifter arm;

said lumbar support element extendible with respect to the upper body support section, with the first ram in a first position creating minimal deflection in a lumbar region of a mattress supported on the upper body support section, and said torque tube rotated with the first ram in a second position extending the at least one angled lifter arm through the at least one aperture to elevate the lumbar support element; and, said lumbar support element positionable across an arc from an upper position with respect to the upper body support section with the second ram in a first position to a lower position with respect to the upper body support section with the second ram in a second position.

6. The articulating bed as defined in claim 5 wherein the lumbar support element is substantially cylindrical for contact with the mattress.

7. The articulating bed as defined in claim 5 wherein the at least one angled lifter arm comprises three angled lifter arms, said at least one lever comprises three levers and said actuator element extends from a central one of the levers.

8. The articulating bed as defined in claim 5 wherein said first ram and said second ram are extendible through a range positioning said lumbar support element at any desired point in an ellipsoidal area.

*9. A lumbar support adjustment mechanism for an articulating bed, the lumbar support adjustment mechanism comprising:*

*a first actuator system having a first actuator pivotally attached to an upper body support section of the articulating bed and pivotally attached to a lumbar support element, the first actuator system being configured to cause the lumbar support element to move*

*between a retracted position creating minimal deflection in a lumbar region of a mattress supported on the upper body support section, and an extended position to elevate the lumbar support element; and*

*a second actuator system having a second actuator pivotally attached to the upper body support section and pivotally attached to the lumbar support element, the second actuator system being configured to cause the lumbar support element to move between an upper position with respect to the upper body support section to a lower position with respect to the upper body support section.*

* * * * *